US008656393B2

(12) United States Patent
Tsuji (10) Patent No.: US 8,656,393 B2
(45) Date of Patent: Feb. 18, 2014

(54) MULTI-CORE SYSTEM

(75) Inventor: Masayuki Tsuji, Shinjuku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 659 days.

(21) Appl. No.: 12/624,105

(22) Filed: Nov. 23, 2009

(65) Prior Publication Data

US 2010/0169889 A1    Jul. 1, 2010

(30) Foreign Application Priority Data

Dec. 25, 2008    (JP) ................................ 2008-331236

(51) Int. Cl.
*G06F 9/46*    (2006.01)

(52) U.S. Cl.
USPC ............ 718/100; 718/102; 718/104; 718/105

(58) Field of Classification Search
None
See application file for complete search history.

(56) References Cited

U.S. PATENT DOCUMENTS

| | | | | |
|---|---|---|---|---|
| 5,361,369 A | * | 11/1994 | Kametani | 718/106 |
| 5,870,604 A | * | 2/1999 | Yamagishi | 718/105 |
| 6,108,693 A | * | 8/2000 | Tamura | 709/213 |
| 6,473,808 B1 | * | 10/2002 | Yeivin et al. | 710/6 |
| 7,444,638 B1 | * | 10/2008 | Xu | 718/104 |
| 2005/0149771 A1 | * | 7/2005 | Todoroki et al. | 713/300 |
| 2005/0172292 A1 | * | 8/2005 | Yamada et al. | 718/105 |
| 2007/0136730 A1 | * | 6/2007 | Wilt et al. | 718/102 |
| 2007/0143759 A1 | * | 6/2007 | Ozgur et al. | 718/102 |
| 2008/0104593 A1 | * | 5/2008 | Parekh et al. | 718/100 |
| 2008/0235689 A1 | * | 9/2008 | Netzer et al. | 718/102 |
| 2008/0250260 A1 | * | 10/2008 | Tomita | 713/324 |
| 2009/0070772 A1 | * | 3/2009 | Shikano | 718/106 |
| 2010/0107174 A1 | * | 4/2010 | Suzuki et al. | 718/104 |
| 2011/0093429 A1 | * | 4/2011 | Ge et al. | 706/54 |

FOREIGN PATENT DOCUMENTS

| | | |
|---|---|---|
| JP | 1994-89188 | 3/1994 |
| JP | 1999-120156 | 4/1999 |

* cited by examiner

*Primary Examiner* — Emerson Puente
*Assistant Examiner* — Charles Swift
(74) *Attorney, Agent, or Firm* — Fujitsu Patent Center (57) ABSTRACT

A multi-core system includes: a first core that writes first data by execution of a first program, wherein the first core gives write completion notice after completion of the writing; a second core that refers to the written first data by execution of a second program; and a scheduler that instructs the second core to start the execution of the second program before the execution of the first program is completed when the scheduler is given the write completion notice from the first core by the execution of the first program.

15 Claims, 8 Drawing Sheets

MULTI-CORE SYSTEM

CROSS-REFERENCE TO RELATED APPLICATIONS

This application is based upon and claims the benefit of priority from the prior Japanese Patent Application No. 2008-331236 filed on Dec. 25, 2008, the entire contents of which are incorporated herein by reference.

FIELD

The present invention relates to a multi-core system.

BACKGROUND

The multi-core system is operable to execute concurrently executable programs by different cores at a time. A plurality of programs can be executed by different cores at a time if there is no dependency between pieces of data handled by the respective programs. If there is data dependency, the program referring to dependent data is required to wait to start the execution until the execution of the program that writes the dependent data is completed. Therefore, there occurs idle time to complete the execution, thereby causing reduction of parallelism of the multi-core system.

Japanese Laid-open Patent Publication No. 06-89188 discloses an automatic parallelization processing system that parallelizes loops, which requires guarantee of final values of local data in micro tasks, without exclusive control or synchronous control by the automatic parallelization function of a compiler to control the overhead, thus improving the processing efficiency of the entire program.

Japanese Laid-open Patent Publication No. 11-120156 discloses a data communication system in a multi-processor system that includes a plurality of processors and a plurality of storages, and particularly discloses a system that sends and receives split data via a communication buffer.

SUMMARY

According to an aspect of the embodiment, a multi-core system includes a first core that writes first data by execution of a first program, wherein the first core gives write completion notice after completion of the writing; a second core that refers to the written first data by execution of a second program; and a scheduler that instructs the second core to start the execution of the second program before the execution of the first program is completed when the scheduler is given the write completion notice from the first core by the execution of the first program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Related Art

Figure 1:
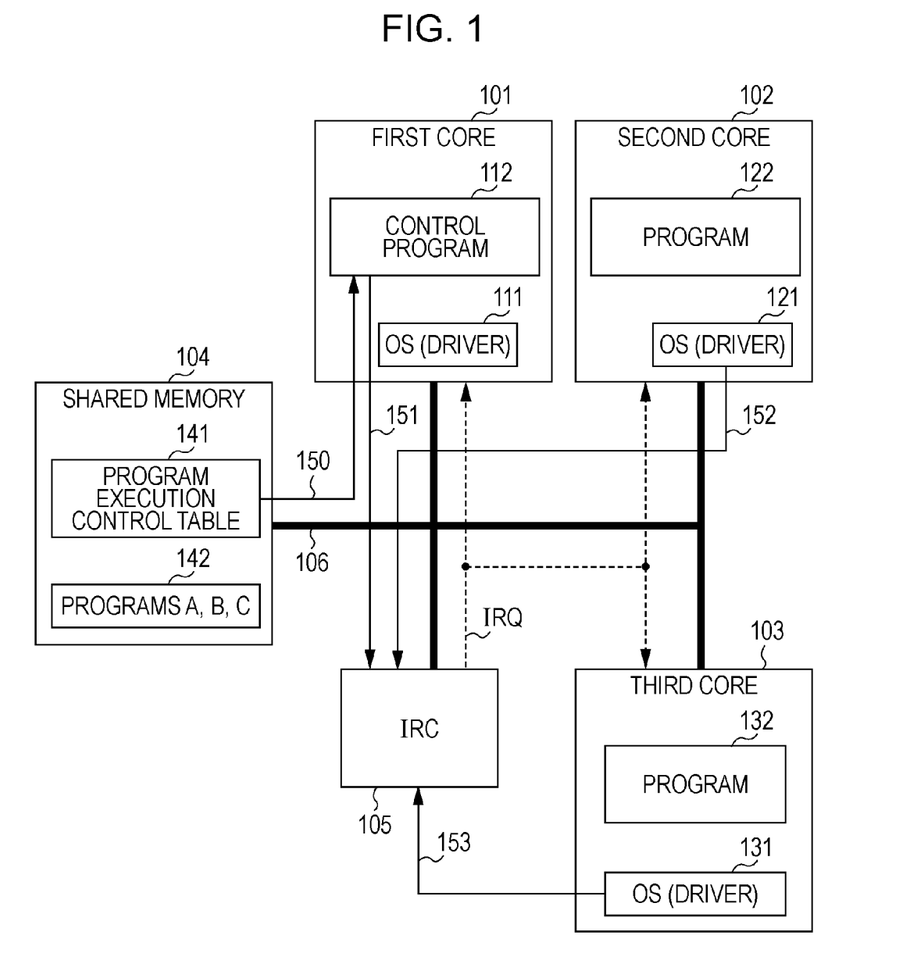
FIG. 1 is a block diagram illustrating an example of the configuration of a multi-core system.

FIG. 1 is a block diagram illustrating an example of the configuration of a multi-core system. The multi-core system includes a first core 101, a second core 102, a third core 103, a shared memory 104, and an interrupt controller (IRC) 105. The shared memory 104 stores therein a program execution control table 141 and programs (including programs A, B, and C) 142. The first core 101 stores therein an operating system or OS (driver) 111 and a control program 112. The second core 102 stores therein an operating system or OS (driver) 121 and a program 122. The third core 103 stores therein an operating system or OS (driver) 131 and a program 132. The programs 122 and 132 may be any one of the respective programs A, B and C that are loaded from the shared memory 104 and executed. The first core 101, the second core 102, the third core 103, the shared memory 104, and the IRC 105 are connected to a bus 106. The IRC 105 is operable to send an interrupt signal IRQ to the first core 101, the second core 102, and/or the third core 103.

Figure 2:
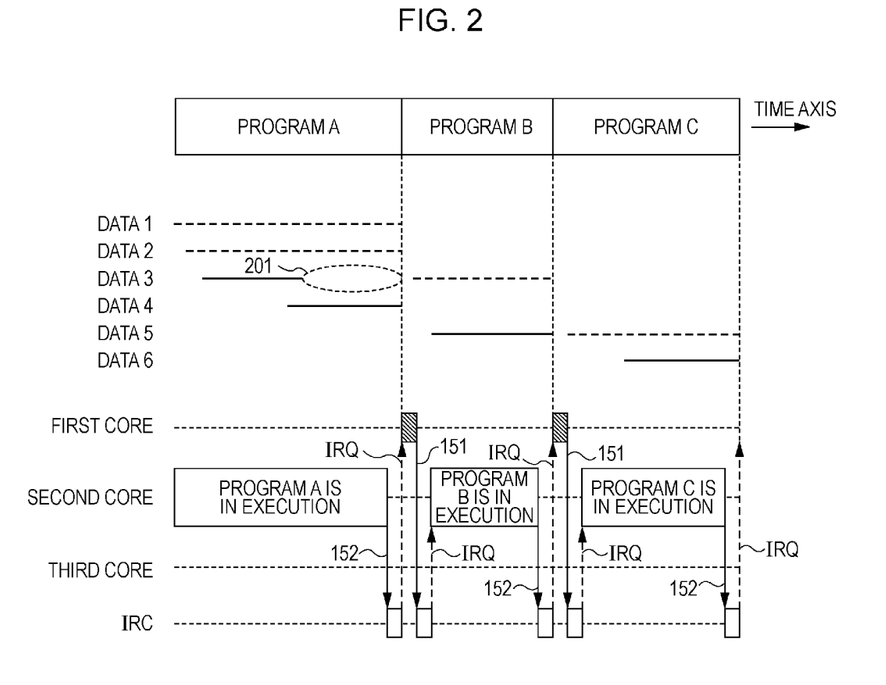
FIG. 2 is a timing diagram illustrating an example of processing of the multi-core system of FIG. 1.

FIG. 2 is a timing diagram illustrating an example of processing of the multi-core system of FIG. 1. Concerning the data 1 to 6 of FIGS. 2, 3, and 7, the solid lines indicate data writing and the broken lines indicate data reference. In the program A, the data 1 and 2 are referred to and the data 3 and 4 are written. In the program B executed subsequently, the data 3 is referred to and the data 5 is written. In the program C executed subsequently, the data 5 is referred to and the data 6 is written.

Since the program B refers to the data 3 written by the program A, the execution of the program B is required to be started after completion of execution of the program A. Therefore, there occurs idle time 201 to wait for completion of the execution of the program A despite the presence of another core capable of executing the program B. Since the program C refers to the data 5 written by the program B, the execution of the program C is required to be started after completion of execution of the program B. The above-described relationship is data dependency.

The first core 101 executes the control program 112 thereby to read data-dependent information 150 among the programs A, B, and C from the program execution control table 141 in the shared memory 104. Thus, the first core 101 determines which of the cores 102 and 103 should execute the next program.

The program A is executed by the second core 102. The second core 102 loads the program A from the shared memory 104 and starts to execute the program A as the program 122. Completing the execution, the second core 102 gives an execution completion notice 152 to the IRC 105 via the bus 106. Then, the IRC 105 gives the execution completion notice 152 to the first core 101 by the interrupt signal IRQ. Then, the first core 101 sends instruction data 151 to the IRC 105 via the bus 106 by the processing of the control program 112. The instruction data 151 is used for assigning the next program B to the second core 102 waiting for a program to be executed, for example. Then, the IRC 105 instructs the second core 102 to start the execution of the next program B by the interrupt signal IRQ. Then, the second core 102 loads the program B from the shared memory 104 and starts to execute the program B as the program 122. Completing the execution, the second core 102 gives the execution completion notice 152 to the IRC 105 via the bus 106. Then, the IRC 105 gives the execution completion notice 152 to the first core 101 by the interrupt signal IRQ. Then, the first core 101 sends the instruction data 151 to the IRC 105 via the bus 106 by the processing of the control program 112. The instruction data 151 is used for assigning the next program C to the second core 102 waiting for a program to be executed, for example. Then, the IRC 105 instructs the second core 102 to start the execution of the next program C by the interrupt signal IRQ. Then, the second core 102 loads the program C from the shared memory 104 and starts to execute the program C as the program 122. Completing the execution, the second core 102 gives the execution completion notice 152 to the IRC 105 via the bus 106. Then, the IRC 105 gives the execution completion notice 152 to the first core 101 by the interrupt signal IRQ.

As described above, the multi-core system assigns the first core 101 to a core for controlling the multi-core and also assigns the second core 102 and the third core 103 to cores for executing target programs. The control core 101 refers to the program execution control table 141 in which the dependency and execution sequence of programs are registered. In accordance with the schedule of the program execution control table 141, the control core 101 sequentially assigns programs to the execution core 102 or 103 waiting for programs to be executed. The execution core 102 or 103 executes the programs in accordance with the assignment of the control core 101. The information on the executed programs (binary code) 142 and the program execution control table 141 are generated using a multi-core compiler 401 (refer to FIG. 4), which is able to extract the data dependency shared between the programs (tasks) and generate programs executable in parallel, and a linker.

The control core 101 refers to the program execution control table 141 and instructs, for example, the second core 102 waiting for a program to be executed, to start the execution of the program A to be executed next. Such instruction is given via the IRC 105 which notifies the targeted second core 102 to start the execution of the next program A. When the second core 102, which is instructed on the execution of the program A, completes the execution of the program A, the second core 102 notifies the IRC 105 of the completion of the execution. The IRC 105 interrupts and notifies the control core 101 that the targeted second core 102 has completed the execution of the designated program A. If there is an executable program B before the execution completion notice from the IRC 105, the control core 101 is allowed to instruct, for example, the third core 103 waiting for a program to be executed, to execute the program B. If there is data dependency between the programs A and B, the execution of the program B is required to be started after completion of the execution of the program A. Such a sequence is repeated to execute the programs. Of these cases, the case where there is data dependency between the programs A and B is illustrated by the timing diagram of FIG. 2. In this case, despite the completion of writing of the data 3 referred to by the program B, the execution of the program B is practically required to be started after completion of the execution of the program A, so that there occurs idle time 201.

Figure 3:
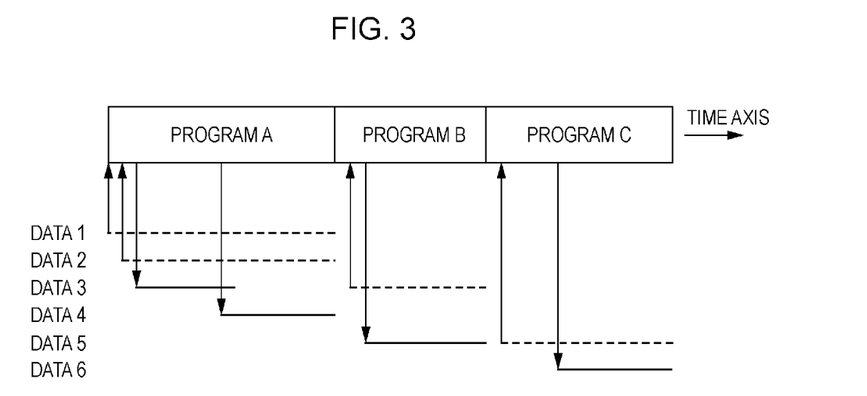
FIG. 3 is a timing diagram in the case where a single core executes the programs A, B and C of FIG. 2.

FIG. 3 is a timing diagram illustrating when a single core executes the programs A, B, and C of FIG. 2. The single core executes the program A to write the data 3 and 4 referring to the data 1 and 2. After completing the execution of the program A, the core executes the program B to write the data 5 referring to the data 3. After completing the execution of the program B, the core executes the program C to write the data 6 referring to the data 5.

As compared to the processing of the single core of FIG. 3, the processing of the multi-core system of FIG. 2 does not take full advantage of the multi-core configuration.

Figure 4:
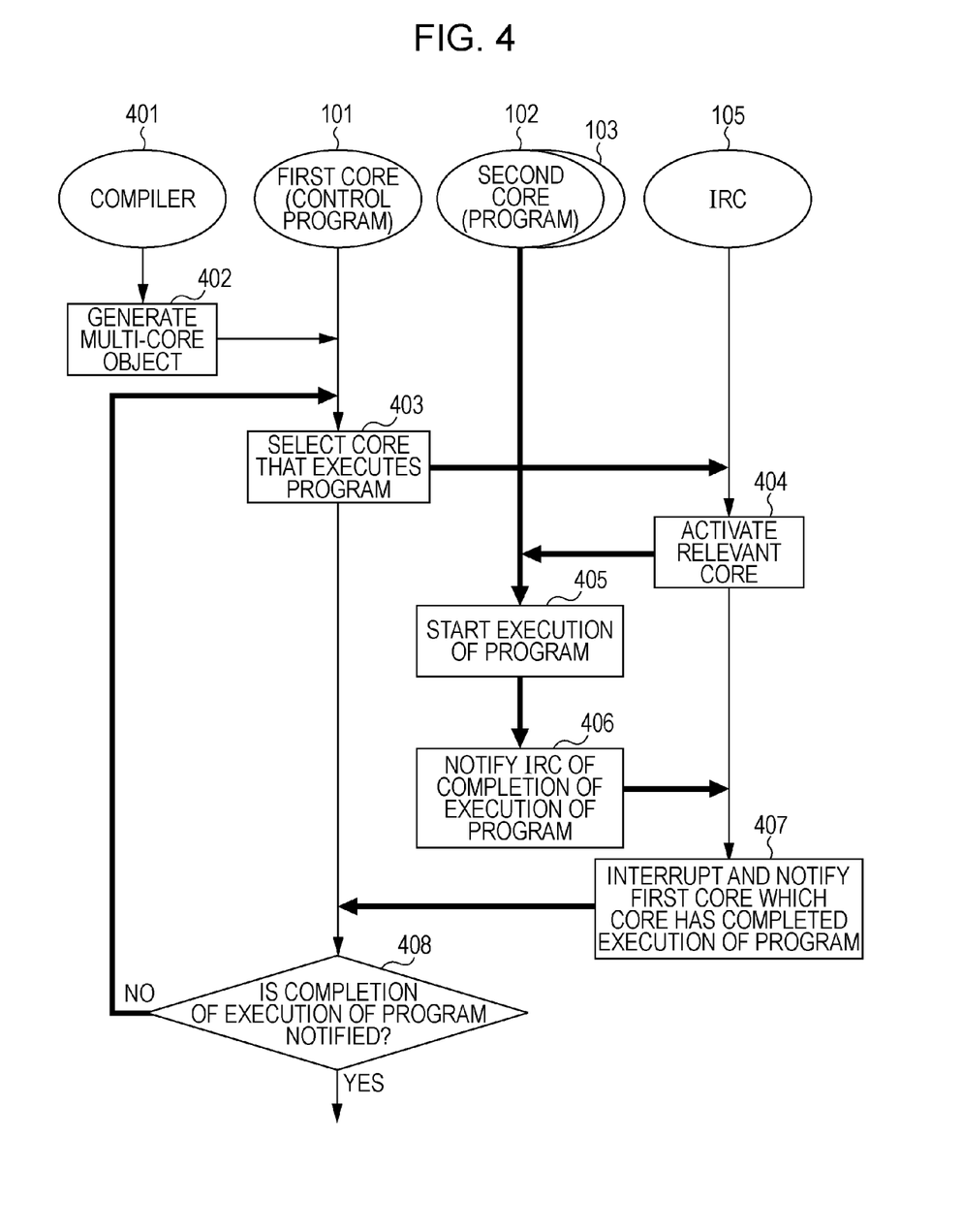
FIG. 4 is a flowchart illustrating an example of processing of the multi-core system of FIG. 1.

FIG. 4 is a flowchart illustrating an example of processing of the multi-core system of FIG. 1. In step 402, the compiler 401 extracts the data dependency shared among programs and generates the programs A, B, and C that are executable in parallel.

In step 403, the first core 101 selects the core for executing the program and notifies the IRC 105 of the selected core. For example, the second core 102 is selected as the core for executing the program A.

In step 404, the IRC 105 activates the core 102 or 103 for executing the program. For example, the second core 102 is activated.

In step 405, the activated core 102 or 103 executes the program. For example, the second core 102 starts to execute the program A.

In step 406, the core 102 or 103 notifies the IRC 105 that the execution of the program has been completed. For example, the second core 102 notifies the IRC 105 that the execution of the program A has been completed.

In step 407, the IRC 105 interrupts and notifies the first core 101 which core has completed the execution of the program. For example, the interrupt signal IRQ notifies the first core 101 that the second core 102 has completed the execution of the program A.

In step 408, the first core 101 determines whether the completion of the execution of the program has been notified. If the completion has not been notified yet, the process returns to step 403. In step 403, the core for executing the next program is selected. If there is data dependency among the programs, the core for executing the next program is not selected. In this case, the core for executing the next program is selected after completion of the execution of the preceding program is notified.

As described above, if there is data dependency among the data handled by the programs A, B, and C, the execution of the program referring to the dependent data is required to be started after completion of the execution of the program writing the data. However, the execution of the program referring to the data is substantially ready to be started at the time of completion of data writing even when the execution of the program writing the data is not actually completed. Thus, there occurs substantially unnecessary idle time 201 to complete the execution, causing data parallelism to be reduced. The following will describe the embodiment addressing the above-described problem.

Embodiment

Figure 5:
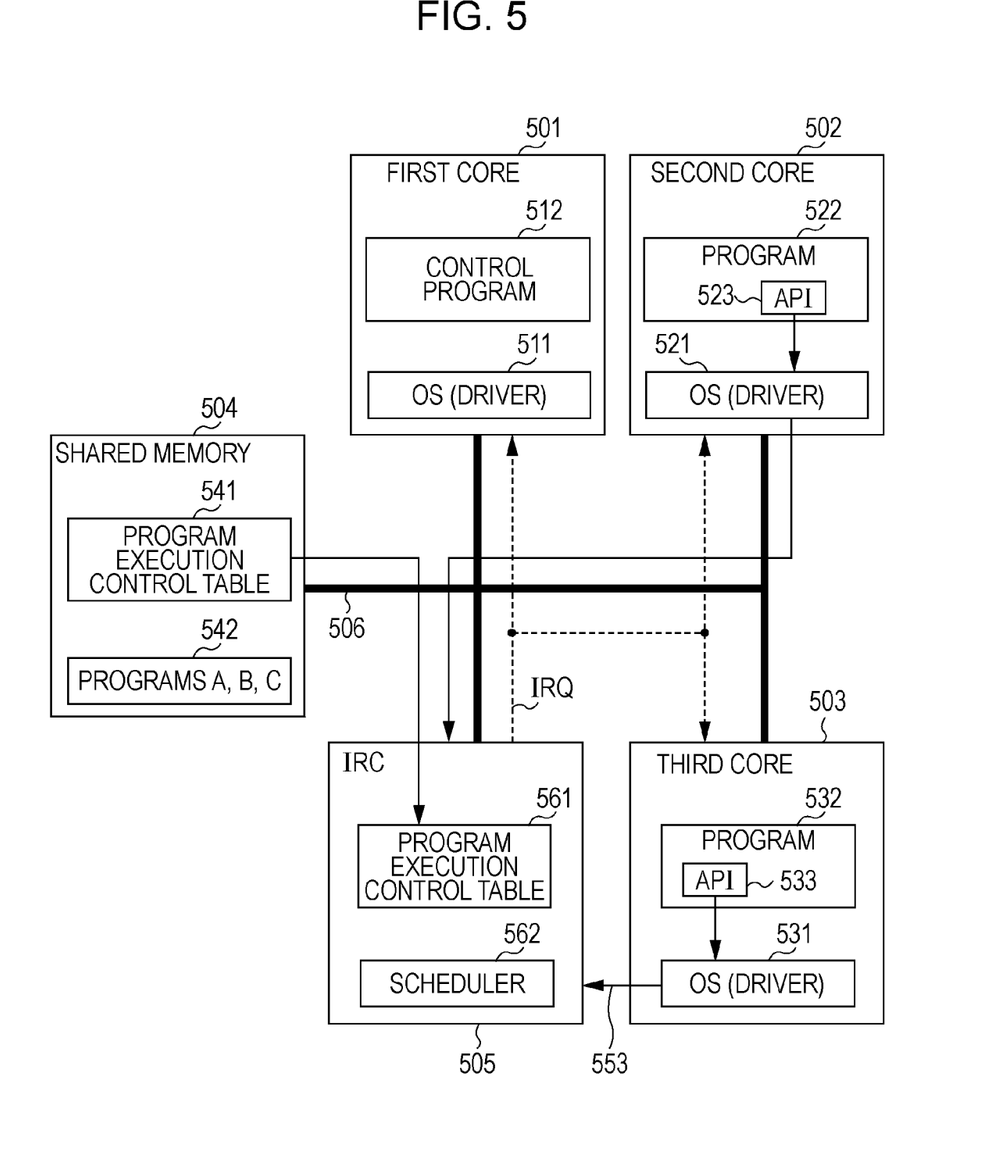
FIG. 5 is a block diagram illustrating an example of the configuration of a multi-core system according to an embodiment of the present invention.

FIG. 5 is a block diagram illustrating an example of the configuration of the multi-core system according to the embodiment of the present invention. The multi-core system of FIG. 5 is formed so that the following elements are added to those of FIG. 1. In an interrupt controller 505, a program execution control table 561 and a scheduler 562 are added. In a program 522 of a second core 502, a write completion notice section 523 is added. In a program 532 of a third core 503, a write completion notice section 533 is added.

The multi-core system includes a first core 501, the second core 502, the third core 503, a shared memory 504, and the interrupt controller (IRC) 505. The shared memory 504 stores therein a program execution control table 541 and programs (including programs A, B, and C) 542. The first core 501 stores therein an operating system or OS (driver) 511 and a control program 512. The second core 502 stores therein an operating system or OS (driver) 521 and the program 522. The program 522 has the write completion notice section 523. The third core 503 stores therein an operating system or OS (driver) 531 and the program 532. The program 532 has the write completion notice section 533. The programs 522 and 532 are any one of the programs A, B, and C that are loaded from the shared memory 504 and executed. The first core 501, the second core 502, the third core 503, the shared memory 504, and the interrupt controller 505 are connected to a bus 506. The interrupt controller 505 is operable to send an interrupt signal IRQ to the first core 501, the second core 502, and/or the third core 503. The first core 501, the second core 502, and the third core 503 are processors, for example. Such processors include a digital signal processor DSP. The foregoing programs A, B, and C each include tasks and/or threads.

The program execution control tables 541 and 561 store therein data dependency among the programs A, B, and C. The write completion notice sections 523 and 533 give write completion notice to the scheduler 562 in the IRC 505 on completion of data writing. The scheduler 562 monitors data dependency between an active program and a subsequently executed program. If writing of all the data referred to by the subsequently executed program has been completed after the scheduler 562 receives the write completion notice notifying that data writing is completed, the scheduler 562 instructs the second core 502 or the third core 503 to execute the subsequent program.

Figure 6:
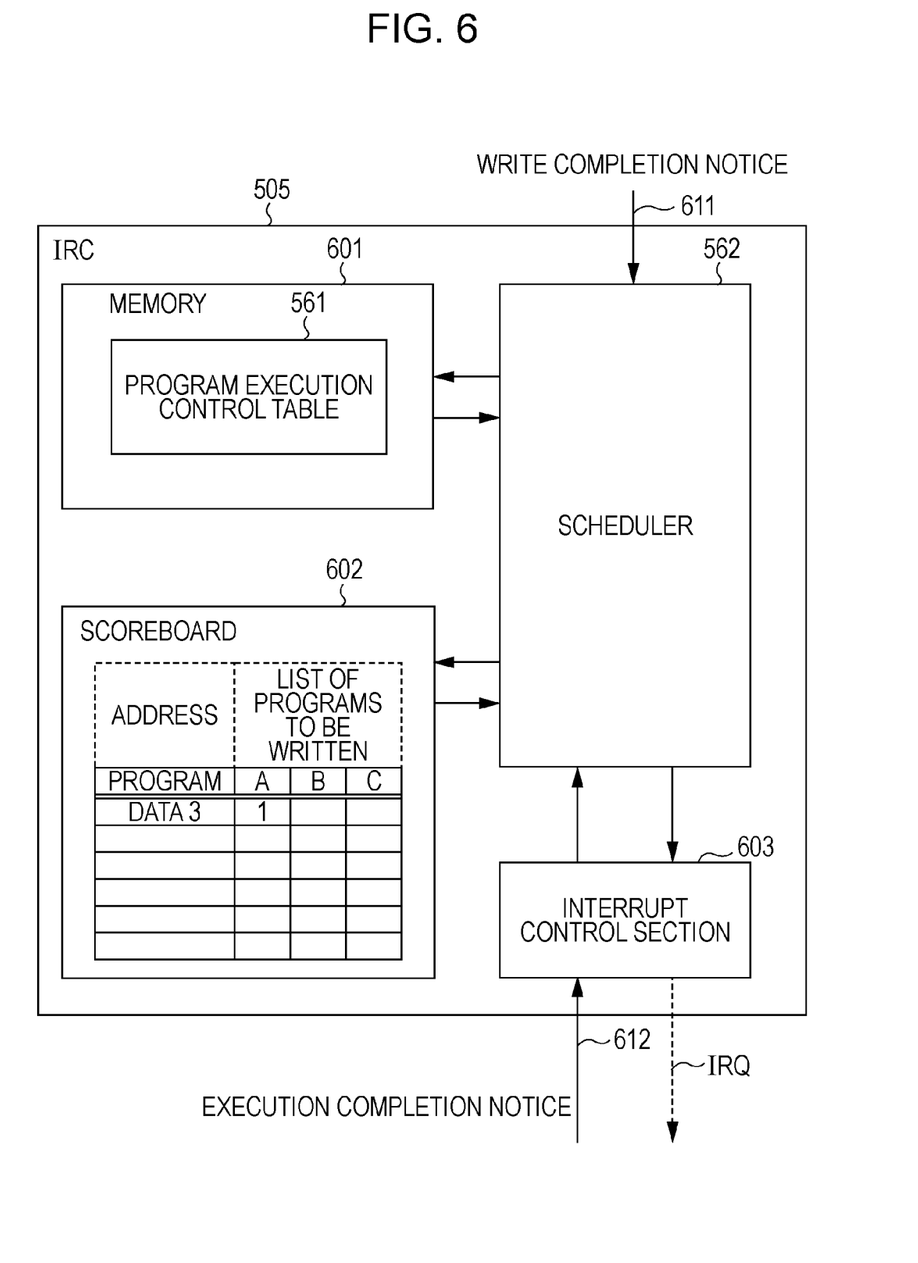
FIG. 6 is a block diagram illustrating an example of the configuration of the interrupt controller (IRC) of FIG. 5.

FIG. 6 is a block diagram illustrating an example of the configuration of the IRC 505 of FIG. 5. The IRC 505 includes the scheduler 562, a memory 601, a scoreboard 602, and an interrupt control section 603. The IRC 505 inputs a write completion notice 611 and an execution completion notice 612 and outputs the interrupt signal IRQ. The scheduler 562 directly inputs the write completion notice 611. The scheduler 562 inputs the execution completion notice 612 via the interrupt control section 603 and also outputs the interrupt signal IRQ via the interrupt control section 603. The write completion notice 611 and the execution completion notice 612 are input from the second core 102 or the third core 103 via the bus 506. The scheduler 562, the memory 601, the scoreboard 602, and the interrupt control section 603 are able to input or output data from or to one another. The memory 601 stores therein the program execution control table 561.

The program execution control table 561 stores therein the data dependency among the programs A, B, and C as described above by referring to FIG. 2. For example, the program execution control table 561 stores therein the dependency of the data 3 between the programs A and B, in which the data 3 written by the program A is referred to by the program B. In accordance with the program execution control table 561, the scheduler 562 instructs, for example, the third core 503 to start the execution of the program B.

The scoreboard 602 stores therein whether or not writing of data in the programs A, B, and C is completed. For example, the scoreboard 602 stores whether the writing of data 3 is completed or not based on the execution of the program A. When the writing of data 3 is not complete, the scheduler 562 writes the number "1" in the row of the data 3 in the column of the program A of the scoreboard 602. When the writing of data 3 is completed, the scheduler 562 writes the number "0" in the row of the data 3 in the column of the program A of the scoreboard 602. That is, when the scheduler 562 is notified of the writing completion notice 611 of the data 3 of the program A, for example, from the second core 502, the scheduler 562 records on the scoreboard 602 that the writing of the data 3 is completed based on the execution of the program A.

Figure 7:
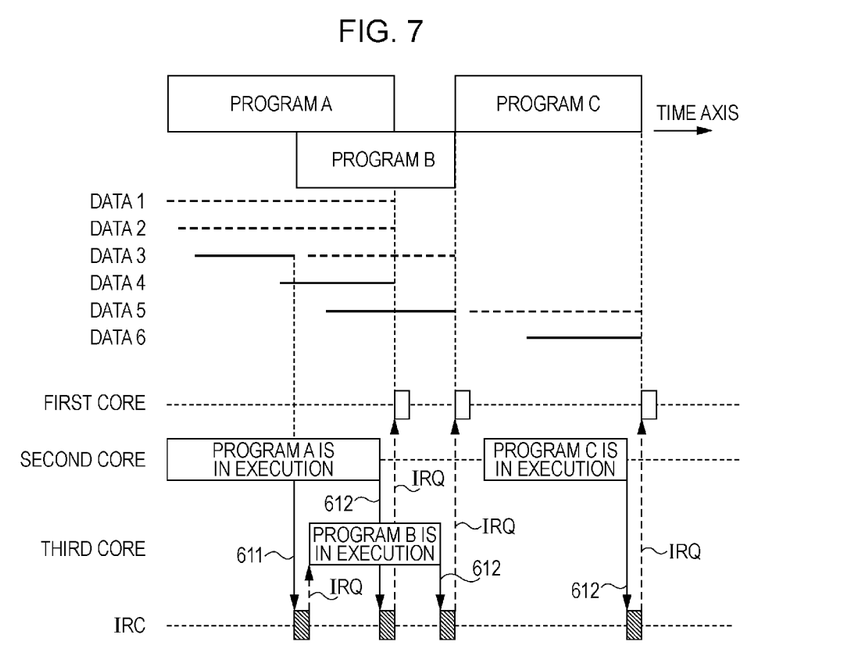
FIG. 7 is a timing diagram illustrating an example of processing of the multi-core system of FIG. 5.

FIG. 7 is a timing diagram illustrating an example of processing of the multi-core system of FIG. 5. Concerning the data 1 to 6, the solid lines indicate data writing and the broken lines indicate data reference. As in the case of FIG. 2, in the program A, the data 1 and 2 are referred to and the data 3 and 4 are written. In the program B executed subsequently, the data 3 is referred to and the data 5 is written. In the program C executed subsequently, the data 5 is referred to and the data 6 is written.

Since the program B refers to the data 3 written by the program A, the execution of the program B is started before the execution of the program A is completed and after writing of data 3 in the program A is completed. Since the execution of the program B is started before the execution of the program A is completed, occurrence of idle time 201 illustrated in FIG. 2 may be prevented. Since the program C refers to the data 5 written by the program B, the execution of the program C is started after writing of the data 5 in the program B is completed. The above relationship is data dependency. Such data dependency is stored in the program execution control tables 541 and 561.

The first core 501 executes the control program 512 to read the data dependency among the programs A, B, and C from the program execution control table 541 in the shared memory 504. Thus, the first core 501 determines which of the cores 502 and 503 preferably execute the program initially.

The program A is executed, for example, by the second core 502. The second core 502 loads the program A from the shared memory 504 and starts to execute the program A as the program 522. When writing of the data 3 in the program A is completed by the processing of the write completion notice section 523 in the program A, the second core 502 gives the write completion notice 611 to the IRC 505. The IRC 505 refers to the program execution control table 561 and the scoreboard 602, and instructs the third core 503, waiting for a program to be executed, to start executing the subsequent program B by the interrupt signal IRQ. The IRC 505 refers to the program execution control table 561 thereby to determine the core that executes the subsequent program B waiting to be executed. The IRC 505 refers to the scoreboard 602 to determine whether writing of all the data referred to by the subsequent program B is completed. When writing of all the data referred to by the subsequent program B is completed, the IRC 505 is able to instruct the third core 503 to start the execution.

By the above instruction, the third core 503 loads the program B from the shared memory 504 and starts to execute the program B as the program 532. Since the execution of the program B may be started before the execution of the program A is completed and after writing of the data 3 in the program A is completed, occurrence of the idle time 201 illustrated in FIG. 2 is reduced if not prevented.

When the execution of the program A is completed, the second core 502 gives the execution completion notice 612 to the IRC 505 via the bus 506. Then, the IRC 505 gives the execution completion notice of the program A to the first core 501 by the interrupt signal IRQ.

When the execution of the program B is completed, the third core 503 gives the execution completion notice 612 to the IRC 505 via the bus 506. Then, the IRC 505 gives the execution completion notice 612 of the program B to the first core 501 by the interrupt signal IRQ. At the same time, the IRC 505 refers to the program execution control table 561 and the scoreboard 602, and instructs the second core 502, waiting for a program to be executed, to start executing the subsequent program C by the interrupt signal IRQ. When writing of all the data referred to by the subsequent program C is completed, the IRC 505 instructs the second core 502 to start the execution.

By the above instruction, the second core 502 loads the program C from the shared memory 504 and starts to execute the program C as the program 522. When the execution of the program C is completed, the second core 502 gives the execution completion notice 612 to the IRC 505 via the bus 506. Then, the IRC 505 gives the execution completion notice 612 of the program C to the first core 501 by the interrupt signal IRQ.

As described above, in the multi-core system of the present embodiment, a programmer previously embeds a write completion code in the data area shared among the programs. In addition to the case of FIG. 4, the compiler 801 (FIG. 8) and the linker decode the write completion code and also record, in the program execution control tables 541 and 561, information on the data-dependent shared data area. The IRC 505 that is embedded in the scheduler 562 initially refers to the program execution control table 541 in the shared memory 504. Subsequently, the IRC 505 derives the program A to be executed and instructs, for example, the second core 502, waiting for a program to be executed, to execute the program A. If a write completion instruction in the shared data area, embedded in the source code, is received by the targeted second core 502 during execution of the program A, the second core 502 notifies the scheduler 562 of the completion of the writing. When the scheduler 562 is given the write completion notice 611 from the shared data area even when the program B, which will be subsequently executed, refers to the shared data area of the preceding program A, it is possible to instruct the third core 503, waiting for a program to be executed, to execute the subsequent program B before the execution of the preceding program A is completed. At the time when writing of the dependent data 3 in the program A is terminated, the subsequent program B is executed. Thus, the idle time 201 of FIG. 2 may be eliminated.

As illustrated in FIG. 6, in order to perform interrupt control at high speed, the scheduler 562 is implemented in the IRC 505. The program execution control table 561 is provided in the local memory 601 in the IRC 505. The program execution control table 561 is a copy of the program execution control table 561 in the shared memory 504. The scheduler 562 refers to the program execution control table 561 thereby to derive the subsequently executed program. The scheduler 562 instructs the core, waiting for a program to be executed, to execute the program using the interrupt signal IRQ. The scheduler 562 refers to the information on the shared data area recorded in the program execution control table 561 and records, in the scoreboard 602, the information on the shared memory area written by the program.

When the scheduler 562 detects the write completion notice 611 from the active core executing the program to the shared data area, the scheduler 562 clears the information on the write incompletion relevant data from the scoreboard 602. When the scheduler 562 selects the program to be executed subsequently, the scheduler 562 refers to the program execution control table 561 and the scoreboard 602. If there exists a program to be executed subsequently and dependency of the shared data area is eliminated, the scheduler 562 instructs the other core, waiting for completion of the execution of the program, to execute the program to be executed subsequently via the interrupt signal IRQ.

The scheduler 562 may not be necessarily embedded in the IRC 505. The scheduler 562 is not necessarily implemented in hardware, but may be implemented in software.

Figure 8:
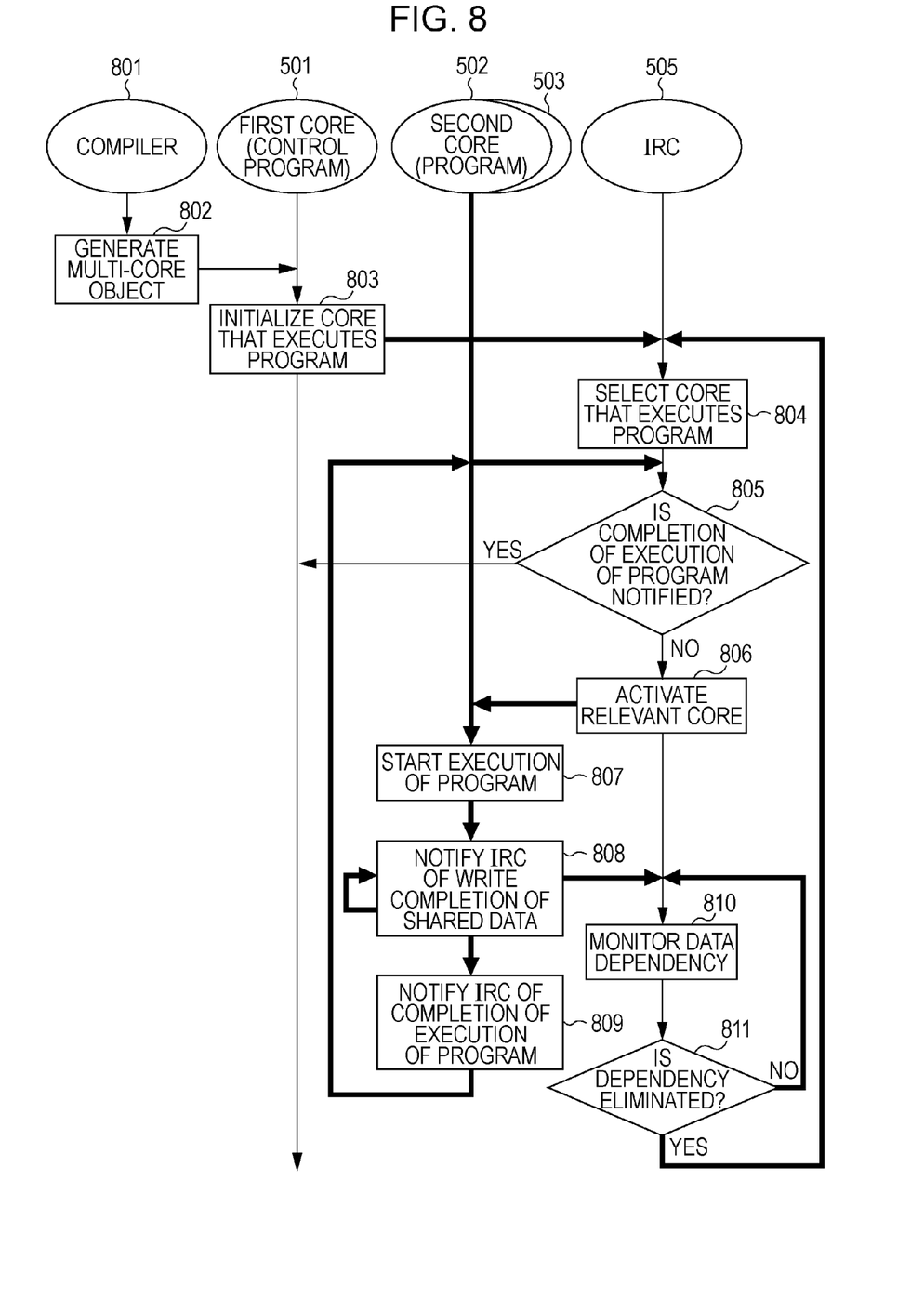
FIG. 8 is a flowchart illustrating an example of processing of the multi-core system of FIG. 5.

FIG. 8 is a flowchart illustrating an example of processing of the multi-core system of FIG. 5. In step 802, the compiler 801 extracts dependency of the data shared among the programs and generates the programs A, B, and C that are executable in parallel.

In step 803, the first core 501 initializes the core that executes the program and notifies the IRC 505 of the core. For example, the second core 502 is selected as the core that executes the program A.

In step 804, the IRC 505 selects the core that executes the program. For example, the second core 502 is selected.

In step 805, the IRC 505 determines whether the execution completion notice 612 of the program is given from the second core 502 or the third core 503 in step 809. If the execution completion notice 612 is not given, the process proceeds to step 806. If the execution completion notice 612 of the program is given, the IRC 505 gives the execution completion notice of the above program to the first core 501.

In step 806, the IRC 505 activates the core that executes the program. For example, the IRC 505 activates the second core 502.

In step 807, the activated second core 502 or third core 503 starts to execute the program. For example, the second core 502 starts to execute the program A.

In step 808, when the active second core 502 or third core 503 completes writing of the shared data, the relevant core gives the write completion notice 611 to the IRC 505. For example, when the second core 502 completes writing of the data 3 in the program A, the second core 502 gives the write completion notice 611 to the IRC 505. The write completion notice sections 523 and 533 give the write completion notice 611 to the IRC 505 each time the writing of each shared data is completed. Then, the process proceeds to steps 809 and 810.

In step 810, the IRC 505 monitors the data dependency. For example, when the IRC 505 is given the write completion notice 611 of the program from the second core 502 or the third core 503, the IRC 505 records the completion of writing of the relevant data of that program in the scoreboard 602.

In step 811, the IRC 505 refers to the program execution control table 561 and the scoreboard 602 and determines whether the data dependency is eliminated. If the writing of all the data referred to in the subsequent program is completed, the IRC 505 determines that the data dependency is eliminated. If the data dependency is not eliminated, the process returns to step 810, in which the IRC 505 monitors the data dependency. If the data dependency is eliminated, the process returns to step 804, in which the IRC 505 refers to the program execution control table 561 and selects the core that executes the subsequent program. For example, the third core 503 is selected as the core that executes the subsequent program B.

In step 809, when the second core 502 or the third core 503 completes the execution of the program, the relevant core gives the execution completion notice 612 to the IRC 505. Then the step 809 returns to step 805. In step 805, as the execution of the program is completed, if there exists a program to be executed subsequently, the IRC 505 instructs the second core 502 or the third core 503 to start the execution of the program.

As described above, in the present embodiment, in order for the programs to recognize the completion of writing of the data safely, developers of the programs add to the programs a description that declares the completion. The active second core 502 or third core 503 gives the write completion notice 611 to the IRC 505 when the writing of the data is completed during the execution of the program. The IRC 505 may recognize the completion of the writing of the data in real time and start to execute the program that refers to the data.

The multi-core system of the present embodiment includes the second core 502 that executes the program A to write the data 3 and then gives the write completion notice 611 to the IRC 505 after the completion of the writing, and the third core 503 that executes the program B to refer to the written data 3. When the scheduler 562 is given the write completion notice 611 from the second core 502 by the execution of the program A, the scheduler 562 instructs the third core 503 to start the execution of the program B before the execution of the program A is completed.

The scheduler 562 instructs the third core 503 to start the execution of the program B in accordance with the dependency of the data 3 between the programs A and B.

When the scheduler 562 is notified of all the write completion notices 611 of the data referred by executing the program B, the scheduler 562 instructs the third core 503 to start the execution of the program B.

When the scheduler 562 is implemented in hardware, the write completion notice 611 is given by the signal line of the hardware.

When the scheduler 562 is implemented in software, the write completion notice 611 is given by the protocol of the software.

The program execution control table 561 stores therein the dependency of the data 3 between the programs A and B, the dependency indicating that the data 3 written by the program A is referred to by the program B. The scheduler 562 instructs the third core 503 to start the execution of the program B in accordance with the program execution control table 561.

The scoreboard 602 stores therein whether or not the writing of the data 3 is completed by the execution of the program A. When the scheduler 562 is given the write completion notice 611 from the second core 502, the scheduler 562 records, in the scoreboard 602, the completion of the writing of the data 3 by the execution of the program A.

The scheduler 562 instructs the third core 503 to start the execution of the program B by the interrupt signal IRQ. For example, the cores 502 and 503 each are a processor.

According to the present embodiment, after the writing of the data 3 by the execution of the program A is completed, since the execution of the program B is started before the execution of the program A is completed, occurrence of idle time to wait for the completion of the execution of the program A is reduced if not prevented and parallelism is improved, accordingly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A multi-core system comprising:
   a first core that writes first data by execution of a first program, wherein the first core gives write completion notice after completion of the writing;
   a second core that refers to the written first data by execution of a second program;
   a scheduler that instructs the second core to start the execution of the second program before the execution of the first program is completed when the scheduler is given the write completion notice from the first core by the execution of the first program, and
   a scoreboard that associates a plurality of pieces of data including the first data with a plurality of programs including the first program and the second program which are executed by a plurality of cores including the first core and the second core, and stores information about whether the writing of the plurality of pieces of data by the execution of the plurality of programs is completed or not,
   wherein when the scheduler is given the write completion notice from one of the plurality of cores which executes one of the plurality of programs, the scheduler records, in the scoreboard, the completion of writing of the piece of data which is associated with the one of the plurality of programs.

2. The multi-core system according to claim 1, wherein the scheduler instructs the second core to start the execution of the second program in accordance with dependency of the first data between the first program and the second program.

3. The multi-core system according to claim 1, wherein the scheduler instructs the second core to start the execution of the second program when the scheduler is given the write completion notice of all data referred to by the execution of the second program.

4. The multi-core system according to claim 1, wherein the write completion notice is given by a signal line of hardware.

5. The multi-core system according to claim 1, wherein the write completion notice is given by a protocol of software.

6. The multi-core system according to claim 2, further comprising:
   a program execution control table that stores the dependency of the first data between the first program and the second program, the dependency indicating that the first data written by the first program is referred to by the second program,
   wherein the scheduler instructs the second core to start the execution of the second program in accordance with the program execution control table.

7. The multi-core system according to claim 1, wherein the scheduler instructs the second core to start the execution of the second program by an interrupt signal.

8. The multi-core system according to claim 1, wherein the first core and the second core each are a processor.

9. The multi-core system according to claim 1, wherein the scheduler monitors dependency of the first data between the first program and the second program and instructs, when not detecting the dependency, the second core to start the execution of the second program.

10. The multi-core system according to claim 9, wherein the scheduler detects the dependency based on a program execution control table that stores the dependency of the first data between the first program and the second program.

11. The multi-core system according to claim 1 further comprising, an interrupt controller that selects a next core of the plurality of cores to execute the other program of the plurality of programs and instructs the next core to execute the other program when the information indicates the completion of the writing of the piece of data which is associated with the other program.

12. The multi-core system according to claim 11, wherein the interrupt controller selects the next core by referring a program execution control table including waiting-core information.

13. A controlling method in multi-core system comprising:
writing, by a first processor, first data by execution of a first program;
outputting write completion notice after completion of the writing;
referring, by a second processor, to the written first data by execution of a second program;
instructing, when not detecting dependency of the first data between the first program and the second program, the second processor to start the execution of the second program before the execution of the first program is completed when receiving the write completion notice from the first processor; and
recording, in the scoreboard that associates a plurality of pieces of data including the first data with a plurality of programs including the first program and the second program which are executed by a plurality of cores including the first core and the second core and stores information about whether the writing of the plurality of pieces of data by the execution of the plurality of programs is completed or not, the completion of writing of the piece of data which is associated with one of the plurality of programs when the scheduler is given the write completion notice from one of the plurality of cores which executes the one of the plurality of programs.

14. The controlling method according to claim 13 further comprising:
selecting a next core of the plurality of cores to execute the other program of the plurality of programs; and
instructing the next core to execute the other program when the information indicates the completion of the writing of the piece of data which is associated with the other program.

15. The controlling method according to claim 14 further comprising, selecting the next core by referring a program execution control table including waiting-core information.

* * * * *